(12) United States Patent
Harris

(10) Patent No.: US 6,892,136 B1
(45) Date of Patent: *May 10, 2005

(54) NON REAL TIME TRAFFIC SYSTEM FOR A NAVIGATOR

(76) Inventor: Scott C. Harris, P.O. Box 927649, San Diego, CA (US) 92192

( * ) Notice: Subject to any disclaimer, the term of this patent is extended or adjusted under 35 U.S.C. 154(b) by 0 days.

This patent is subject to a terminal disclaimer.

(21) Appl. No.: 10/455,866

(22) Filed: Jun. 6, 2003

Related U.S. Application Data

(63) Continuation of application No. 09/682,200, filed on Aug. 3, 2001, now Pat. No. 6,604,047.

(51) Int. Cl.$^7$ .............................................. G01C 21/26
(52) U.S. Cl. ...................... 701/213; 701/201; 701/207; 701/214; 340/988; 342/357.01; 342/357.08
(58) Field of Search ................................. 701/200, 201, 701/206, 207, 211, 213, 214; 340/988, 990, 995.1; 342/357.01, 357.06, 357.08, 357.13

(56) References Cited

U.S. PATENT DOCUMENTS

| 5,790,974 A | 8/1998 | Tognazzini | 701/204 |
| 5,909,440 A | 6/1999 | Ferguson et al. | 370/389 |
| 5,999,892 A | * 12/1999 | Fan | 702/158 |
| 6,199,009 B1 | 3/2001 | Meis et al. | 701/202 |
| 6,208,934 B1 | 3/2001 | Bechtoisaim et al. | 701/209 |
| 6,522,875 B1 | * 2/2003 | Dowling et al. | 455/414.3 |
| 6,604,047 B1 | * 8/2003 | Harris | 701/213 |
| 2001/0004725 A1 | * 6/2001 | Yagyu | 701/210 |
| 2001/0027375 A1 | * 10/2001 | Machida et al. | |

FOREIGN PATENT DOCUMENTS

EP          2 298 539 A    4/1996

* cited by examiner

Primary Examiner—Gertrude A. Jeanglaude

(57) ABSTRACT

A system for improving the operation of a GPS based navigator. Statistical and/or time of day information is used to select the best route between a current location and a desired location. The statistical information may take into account anomalies, and a user can select the amount of risk they which take. The system can be updated with more updated information. In addition, the selection of the desired location can be carried out by downloading information from a PDA.

43 Claims, 3 Drawing Sheets

NON REAL TIME TRAFFIC SYSTEM FOR A NAVIGATOR

CROSS RELATED APPLICATIONS

This application is a continuation of U.S. application Ser. No. 09/682,200 filed Aug. 3, 2001, now U.S. Pat. No. 6,604,047.

BACKGROUND

Various systems, including but not limited to the Magellan 750 ("NeverLost (TM)") device automatically track the user's whereabouts and instructs the user on the best way to get from point A to point B. For example, systems such as this may find the user's current position using satellite positioning systems such as the GPS constellation array. The user may enter a desired location. The program includes map data which includes a time that it will take, on average, to traverse a given stretch of roadway. This data may be acquired by simply dividing the speed limit by the length of the roadway. The system carries out a program to determine a most efficient way for the user to get to his desired location.

This system may operate admirably, and almost always results in the user getting to their desired location. However, the selection of routes does not take into account the real situation. For example, the user who knows an area will often select a better route than the computer will select.

SUMMARY

The present application teaches an improvement to existing navigator systems which enables improvements and new techniques in selection of routes.

In one aspect, the present application teaches use of statistical data in selecting the proper route.

In another aspect, the system may use real-time information.

An interface with the information stored in a PDA is disclosed.

Another aspect teaches a way in which the route may be calculated to allow the user to start in the proper direction.

Yet another aspect teaches a way of using the system to determine a location in for the user to obtain some desired product or service.

BRIEF DESCRIPTION OF THE DRAWINGS

These and other aspects will now be described in detail with reference to the accompanying drawings, wherein.

DETAILED DESCRIPTION

Figure 1:
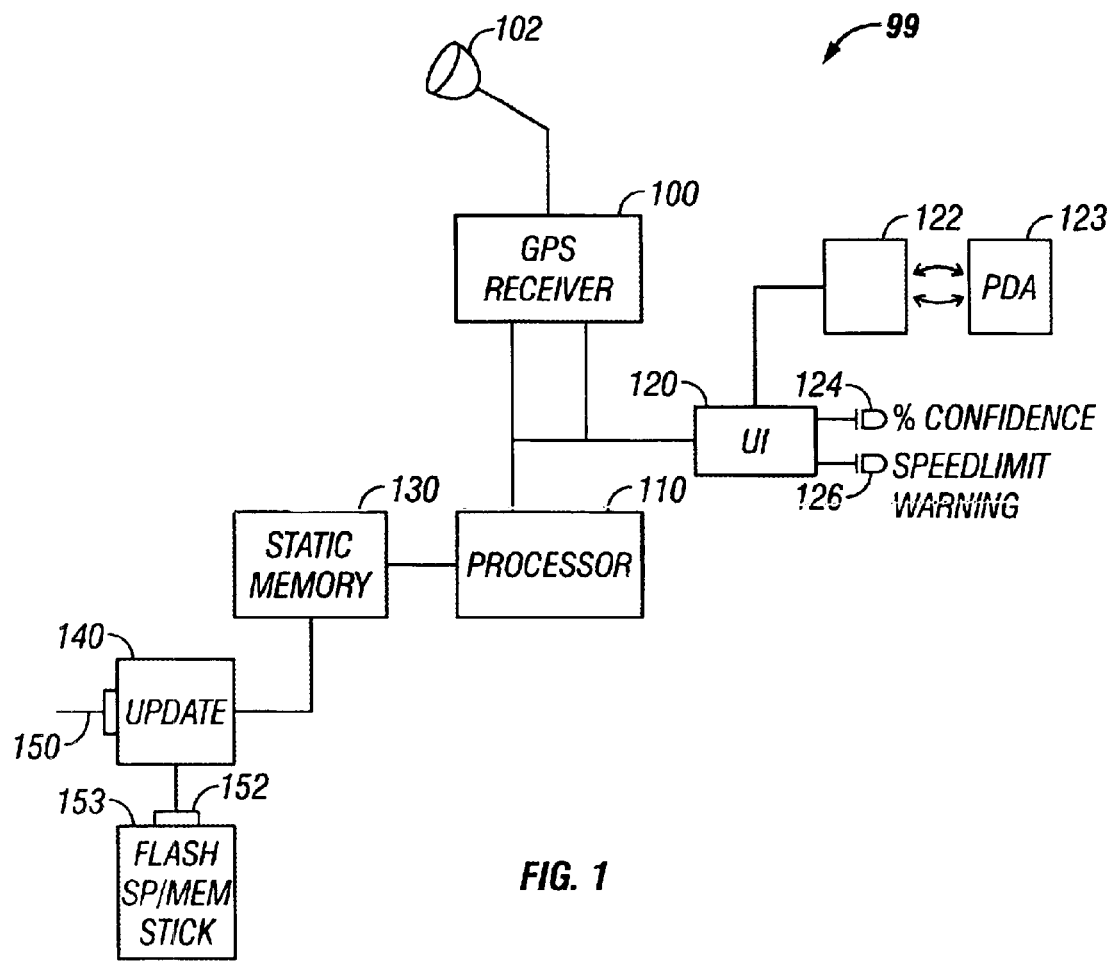
FIG. 1 shows a block diagram of the system.

A block diagram of the system is shown in FIG. 1. A GPS receiver 100 is shown connected to an appropriate GPS antenna 102 to track the location of the installed device 99. This location may be in a vehicle, for example. A processor 110 is connected to the GPS receiver and may control the operation of the GPS receiver and also receive incoming information therefrom. The processor is connected to a memory 130 which is shown herein as a static memory. In current technology, this may be a hard drive, but could alternatively be flash memory or another kind of read/write memory. The memory is connected to an update module 140. As shown, the update module may have a connection to a network line 150 which may be a telephone, an thernet connection, or any other kind of connection to any source of information. The update module may also include a connector 152 allowing connection of a portable memory shown as 153. The portable memory, for example, may be camera type memory, such as flash memory, S.D. memory, or a memory stick. The memory is used for updating information, as described herein.

A user interface 120 is connected to the processor, and provides information to a user, as well as accepting input from a user. The input may be provided from the user in a conventional way, such as on a miniaturized keyboard or trackwheel. An alternative data information is via a PDA interface assembly shown as 122. This may enable a user to enter information about their desired route or destination into PDA 123. Downloading of such desired routes are already available on certain Web sites such as HTTP:\\www.MapQuest.com.

Alternatively, the PDA often stores addresses indicating the addresses of the user's contacts. The address from the PDA may be also transferred to the PDA interface device 122. The PDA interface device may be for example an infrared port, for those PDAs which have infrared capability. For example, on Palm operating system devices, the user of the PDA can select the option to "beam address". The Palm unit will then beam the address to the interface device 122 which receives and decode to the beamed address, and uses that as the desired location. Alternatively, the interface device may be a connection to the serial, parallel or USB port on the PDA.

The user interface also includes a keyboard as described above and a display. Additional functions may be provided. One such function is the indicator 124, which may indicate, for example, the likelihood that the device is actually tracking the proper location of the installed device 99. Many times, the GPS receiver has not adequately acquired sufficient data to be sure that it knows its proper location. When that happens, the GPS receiver may return its best guess information, but might not be very sure or of that information. Accordingly, the indicator 124 may be a bicolor LED which may be green to indicate that the GPS receiver is highly confident in its current location. It may be red to indicate that the confidence level in the current location is low. Another indicator at 126 is a speed limit warning. The map data stored in the static memory 130 often includes the road's speed limits. As part of the synchronization via the GPS receiver, the system automatically acquires the speed of the vehicle. The indicator 126 may be a settable indicator that indicates when the user, for example, is going 10 mph above the speed limit.

The static memory 130 stores information about maps and routes within those maps. In order to make a decision about the best route to take, the static memory often needs information about how long it will take to get from one point in the map to another. The routines of FIG. 2 may be used according to this embodiment to get this information. Certain existing satellite systems, such as the etak system, provide traffic reports that indicate to user the current status of current traffic. The main problem with this system, however, is that the traffic report is current as of the time it is given, not when the user actually arrives there. Many users lose confidence in such traffic reports because by the time they arrive at the scene, the traffic may be changed. In addition, the infrastructure necessary to provide such real-time information may be extremely costly.

The present application teaches a system which may improve the ability to find the best route, but does so using a statistical technique. According to the present system, information about real progress through certain roots is accumulated. This data is accumulated as a function of time of day. The information is used to form statistical data. The statistical data may include, for example, the percent of anomalies. One example is anomalies caused by special events. Roadways which pass close to situses of events may often have high traffic at the time of the event. By noting the number of times that anomalies occur, the "expected value" of the time of a trip may be lowered.

A route may be selected based on different parameters. For example, the route may be selected for the one which is most consistently clear. Anomalies may be taken into account when calculating the route, but the user may choose to take a chance that any route will still be the best. All of this is at the user's discretion, but allows the system to have more accurate data based on statistical analysis.

Figure 2:
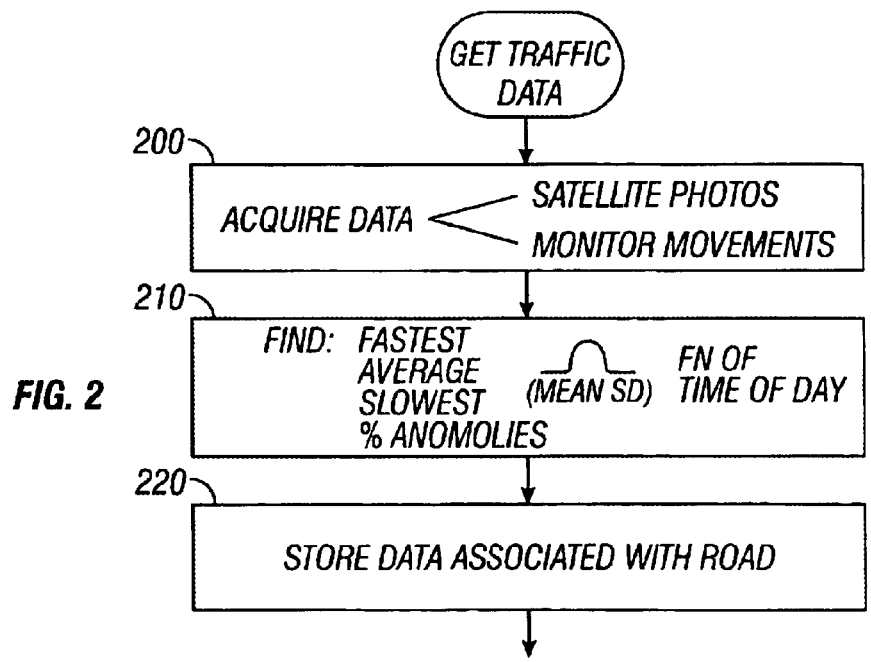
FIG. 2 shows a flowchart of finding traffic information.

The date acquisition routine is shown in FIG. 2. The heart of the data acquisition routine is 200 which acquires real data from real movements. This may be carried out via monitoring satellite photos, for example, to find different movements of different vehicles. Since satellite photos are often taken at separated times, these movements may be used to find the average time to traverse a given stretch of roadway. Another technique, which is disclosed herein, is made possible by the fact that the unit 110 actually tracks users movements. Accordingly, the second alternative is to monitor movements within the installed vehicle 99, and later obtain information from many different users as part of the update routine.

In this contemplated that certain users will not want their movements to be monitored, for example based on privacy concerns. This system will therefore provide the user with the capability of making their movements private. However, a certain advantage may be offered to those users who allow data about to their movements to be uploaded as part of the update routine. Note that the data can be anonymous data, i.e. it can be uploaded without any indication of its origin. As an example of the advantage provided to those users who allow the data to be uploaded, a user may receive a discount on updates if they allow their data to be uploaded as part of the process.

At 210, the real-time data is used to find the various information about the different roadways. As a function of time of day, this system may find the fastest time, slowest time, average time, as well as higher order statistics about these times. These higher order statistics may include mean and standard deviation. Another parameter which may be used includes likelihood of anomalies: indicating a percentage of the time that the actual time to traverse is significantly different than the average time to traverse. All of this information is accumulated into a form associated with the stretch of roadway and will be stored in the static memory 130. The storage of the data is shown occurring at 220.

Figure 3:
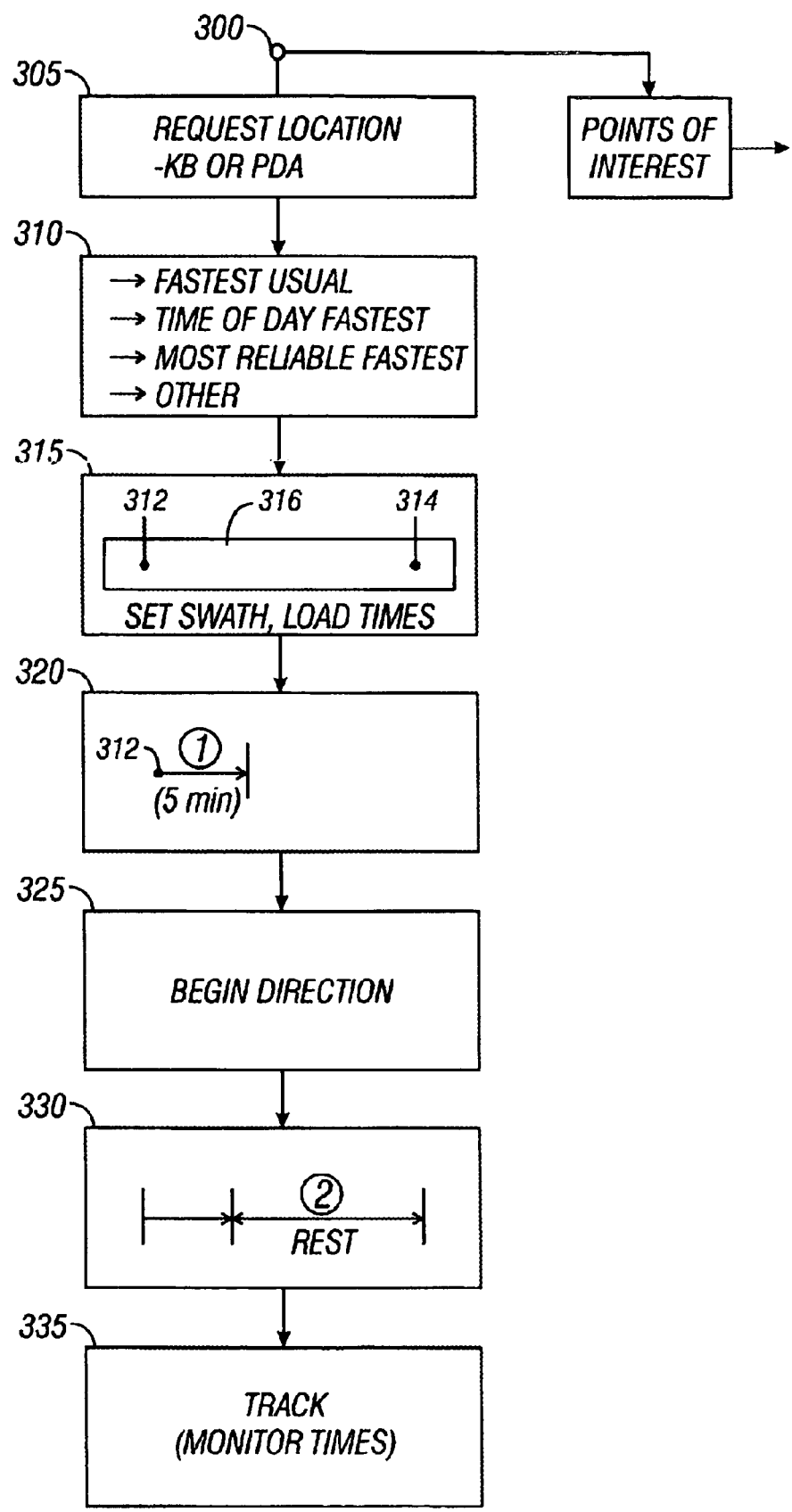
FIG. 3 shows a flowchart of route finding operations.

This information may change over time, and therefore frequent updates may make the system more accurate. These updates may also include additional map information. The updates may be provided in any desired form via the update module 140. The manufacturer or map issuer may charge for those updates as described above. The actual operation of the system uses the flowchart shown in FIG. 3. At 300, the user is allowed to select between a number of different operations, including requesting a mapping to a location at 305. An alternative allows the user to look for "points of interest" which is described in the flowchart of FIG. 4.

After requesting a current location, the user is presented with a number of options at 310. These may include conventional options such as shortest time, shortest distance, and least use of freeways. In addition, some enhanced options are shown as being provided. A new option includes fastest usual, which will set the route based on the fastest route which would be usual over all times. Another new option is time of day fastest, which selects the fastest route for the current time of day. This may divide the time of day generally into morning rush, evening rush, afternoon, and non Roche. Alternatively, the slices may be the sliced thinner, e.g. in one hour increments. Another new option is most reliable fastest, meaning the route that is most reliable to get one to the destination in the shortest time.

After selecting the option at 310, the system initially, at 315, selects a swath 316 around the current location 312 and the destination 314. This area 316 may be the area within which the route will be selected. At 320, the system first routes a first portion of the route, which begins at 312, and moves the user in the proper direction towards the destination. Users often do not want to wait while the system calculates the entire route from their current location to their destination. Such calculation may take minutes, and users will often not wait those minutes. This system therefore selects a relatively small part of the route e.g. the route for the next five minutes. This portion is initially calculated at 320, following by the system beginning the process of directing the user at 325. This may point the user in the right direction, while the remainder of the route is calculated at 330. After 330, the system continues the tracking and monitoring operation. This is generically shown as 335.

Figure 4:
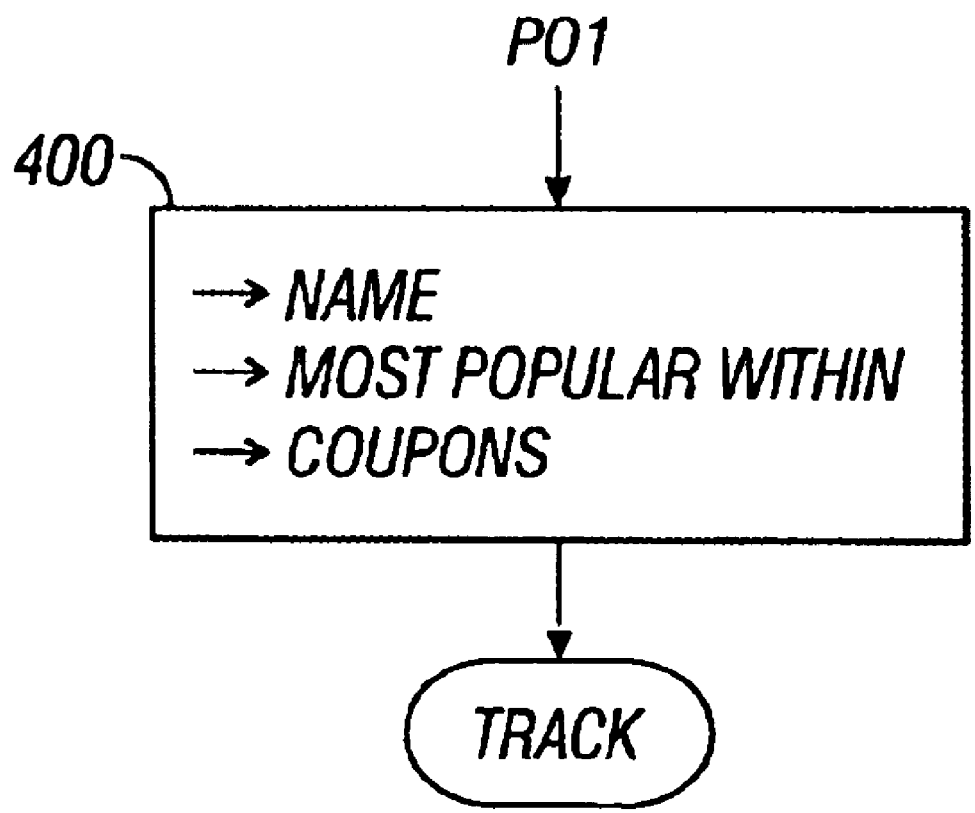
FIG. 4 shows a flowchart of finding points of interest.

FIG. 4 shows the points of interest setting. In conventional GPS units, the points of interest setting enables the user to find items close to them such as parks, restaurants, service stations. If the user is in an unfamiliar location, this may be very helpful. However, the device provides no information about which of many places to select other than name and distance/time to travel.

The present application recognizes that more frequent access usually indicates that the point of interest may be interesting. Accordingly, at 400, a new setting is provided indicating the point of interest within a specified type that is "most popular". This may indicate a point of interest that is most popular within a five-minute drive or the like. Again, this is based on monitoring other users movements, and may be used as part of an update routine.

Another aspect recognizes that many people are driven by specials such as coupons. In this embodiment, an option may provide coupons from certain points of interest. A coupon code may be provided by the processor based on information obtained during an update. For example, the coupon may be a six digit alphanumeric code that meets a specified checksum and provides a specified amount of discount at the specified location. The coupon information obtained during the update may have an expiration date, and may have a number of times that the coupon can be used.

Although only a few embodiments have been disclosed in detail above, other modifications are possible. All such modifications are intended to be encompassed in the following claims.

What is claimed is:

1. A method, comprising:

obtaining information indicative of a current position and a desired position; and navigating between said current position and said desired position by first mapping a portion of the route closest to the current position, but less than the entire portion of the route, beginning a guiding operation which guides a user of the system along the route, and subsequently finishing said mapping by mapping the remainder of the entire portion of the route.

2. A method as in claim 1, wherein said navigating comprises wherein said portion of the route closest to the current position includes a portion of the route which will take a specified amount of time to travel.

3. A method as in claim 1, further comprising storing information used for said mapping, and updating said information.

4. A method as in claim 3, wherein said updating information includes information on updated road conditions, which road conditions are indicative of actual times to traverse different section of roadway, and includes newer information about said actual times.

5. A method as in claim 3, wherein said updating information includes updating most commonly requested destinations.

6. A method as in claim 3, wherein said updating comprises providing information to a server about previous mapping operations, and receiving information from said server.

7. A method as in claim 6, wherein said most commonly requested destinations are destinations most commonly requested by all users who have done said updating.

8. A method as in claim 3, wherein said updating comprises providing discount coupons for certain map locations.

9. A method in claim 3, wherein said obtaining information comprises using satellite positioning to obtain a current location.

10. A system, comprising:
a memory, storing map information; and storing roadway conditions indicative of actual times to traverse different sections of roadway;
a user interface, allowing entry of a destination for navigation;
a processor, computing a path to said destination, based on said map information, by selecting a path based on said roadway conditions; and
an update element which allows updating said roadway conditions to define new and more recent times to traverse said different sections of roadway.

11. A system as in claim 10, wherein said memory stores most commonly requested destinations, and said user interface displays and allows selection of one of said most commonly requested destinations.

12. A system as in claim 10, wherein said memory stores most commonly requested destination, and said user interface displays and allows selection of one of said most commonly requested destinations wherein said updating information includes updating most commonly requested destinations.

13. A method as in claim 10, wherein said updating comprises providing information to a server about previous mapping operations, and receiving information from said server.

14. A method as in claim 12, wherein said said most commonly requested destinations are destinations most commonly requested by all users who have done said updating.

15. A method as in claim 8, further comprising using a satellite positioning system to determine a current position.

16. A system, comprising:
a memory, storing map information, including commonly requested destinations by each of a plurality of users;
a user interface, allowing entry of a destination for navigation including allowing selection of one of said most commonly requested destinations;
a processor, computing a path to said destination, based on said map information, by selecting a path.

17. A system as in claim 16, further comprising an update element that allows updating said information used for said mapping.

18. A system as in claim 17, wherein said memory stores information indicative of road conditions, and said updating information by said updating element provides information on updated road conditions.

19. A system as in claim 17, wherein said updating information by said updating element includes updating most commonly requested destinations.

20. A system as in claim 17, wherein said updating information by said updating element comprises providing information to a server about previous mapping operations, and receiving information from said server.

21. A system as in claim 17, wherein said most commonly requested destinations are destinations most commonly requested by all users who have done said updating using said updating element.

22. A system as in claim 17, wherein said processor computes said path by first mapping a portion of the route closes to the current position, but less than the entire portion of the route, beginning a guiding operation which guides a user of the system along the route, and subsequently finishing said mapping by mapping the remainder of the entire portion of the route.

23. A system as in claim 16, further comprising a satellite positioning system, determining a current position.

24. A system, comprising:
a position determining element, which operates to automatically determine its position;
a memory, storing map information;
a user interface, allowing entry of information for mapping, and displaying information from at least one of said map information and said position;
a processor, computing information based on said information for mapping, and also using said position information from said position determining element to determine a speed of movement, and wherein said processor compares said speed with a target speed and provides an indication when said speed exceeds said target speed by a specified amount.

25. A system as in claim 24, wherein said user interface allows entry of a destination, and said processor also determines a path to said destination, based on said map information, by selecting a path.

26. A system as in claim 24, wherein said map information includes most only requested destinations for each of a plurality of users.

27. A system as in claim 24, further comprising an update element that allows updating said information used for said mapping.

28. A system as in claim 24, wherein said memory stores information indicative of road conditions, and said updating information by said updating element provides information on updated road conditions.

29. A system as in claim 26, wherein said updating information by said updating element includes updating most commonly requested destinations.

30. A system as in claim 26, wherein said updating information by said updating element comprises providing information to a server about previous mapping operations, and receiving information from said server.

31. A system as in claim 24, wherein said processor makes a determination of a likelihood that the position detecting by said position detecting element is correct, and said user interface displays information indicating said likelihood.

32. A system as in claim 24, wherein said memory stores speed limit information along with said map information, and said processor uses said speed limit information as said target speed.

33. A system as in claim 24, wherein said processor computes said path by first mapping a portion of the route closes to the current position, but less than the entire portion of the route, beginning a guiding operation which guides a user of the system along the route, and subsequently finishing said mapping by mapping the remainder of the entire portion of the route.

34. A system, comprising:
- a position determining element, which operates to automatically determine its position;
- a memory, storing map information;
- a user interface, allowing entry of information for mapping, and displaying information from at least one of said map information and said position;
- a processor, computing information based on said information for mapping, and also determining a likelihood that the position detecting by said position detecting element is correct, and wherein said user interface displays information indicating said likelihood.

35. A system as in claim 34, wherein said processor uses said position information from said position determining element to determine a speed of movement, and wherein said processor compares said speed with a target speed and provides an indication when said speed exceeds said target speed by a specified amount.

36. A system as in claim 35, wherein said memory stores speed limit information along with said map information, and said processor uses said speed limit information as said target speed.

37. A system as in claim 35, wherein said user interface allows entry of a destination, and said processor also determines a path to said destination, based on said map information, by selecting a path.

38. A system as in claim 36, wherein said map information includes most only requested destinations for each of a plurality of users.

39. A system as in claim 36, further comprising an update element that allows updating said information used for said mapping.

40. A system as in claim 36, wherein said memory stores information indicative of road conditions, and said updating information by said updating element provides information on updated road conditions.

41. A system as in claim 40, wherein said updating information by said updating element includes updating most commonly requested destinations.

42. A system as in claim 40, wherein said updating information by said updating element comprises providing information to a server about previous mapping operations, and receiving information from said server.

43. A system as in claim 40, wherein said processor computes said path by first mapping a portion of the route closest to the current position; but less than the entire portion of the route, beginning a guiding operation which guides a user of the system along the route, and subsequently finishing said mapping by mapping the remainder of the entire portion of the route.

* * * * *